United States Patent
Racho

(10) Patent No.: US 9,737,060 B1
(45) Date of Patent: Aug. 22, 2017

(54) FISHING APPARATUS

(71) Applicant: Jeffrey Racho, Austin, TX (US)

(72) Inventor: Jeffrey Racho, Austin, TX (US)

( * ) Notice: Subject to any disclaimer, the term of this patent is extended or adjusted under 35 U.S.C. 154(b) by 0 days.

(21) Appl. No.: 15/441,162

(22) Filed: Feb. 23, 2017

(51) Int. Cl.
*A01K 83/00* (2006.01)
*A01K 99/00* (2006.01)
*A01K 81/04* (2006.01)
*A01K 97/18* (2006.01)
*H02J 50/10* (2016.01)

(52) U.S. Cl.
CPC .............. *A01K 83/00* (2013.01); *A01K 81/04* (2013.01); *A01K 97/18* (2013.01); *A01K 99/00* (2013.01); *H02J 50/10* (2016.02)

(58) Field of Classification Search
CPC ........ A01K 83/00; A01K 81/04; A01K 97/18; A01K 99/00; A01K 83/02; A01K 81/00; A01K 97/00
USPC .................................. 43/43.16, 43.4, 22.8, 6
See application file for complete search history.

(56) References Cited

U.S. PATENT DOCUMENTS

| | | | | |
|---|---|---|---|---|
| 4,506,469 A * | 3/1985 | Calagui | ................. | A01K 83/02 43/34 |
| 4,772,784 A * | 9/1988 | Yoshitoshi | ............... | G02B 1/10 250/216 |
| 5,138,790 A * | 8/1992 | McManus | .............. | A01K 91/04 43/43.16 |
| 6,176,033 B1 * | 1/2001 | Latwesen | ............... | A01K 83/00 424/410 |
| 6,189,257 B1 * | 2/2001 | Ulrich | .................... | A01K 83/00 43/43.16 |
| 6,497,068 B1 * | 12/2002 | Lemons | ................. | A01K 83/02 43/36 |
| 6,620,308 B2 | 9/2003 | Gilbert | | |
| 7,332,218 B1 | 2/2008 | Gilbert | | |
| 7,968,188 B2 | 6/2011 | Gilbert | | |
| 8,020,337 B1 * | 9/2011 | Batton | ................... | A01K 83/02 43/36 |
| 9,429,399 B2 * | 8/2016 | York | | |
| 2005/0252070 A1 * | 11/2005 | Becker | .................. | A01K 85/01 43/17.6 |
| 2013/0036657 A1 * | 2/2013 | Stull | ...................... | A01K 83/00 43/43.16 |
| 2017/0112112 A1 * | 4/2017 | Palzkill | ................. | A01K 83/02 |

\* cited by examiner

*Primary Examiner* — Peter M Poon
*Assistant Examiner* — Magdalena Topolski

(57) ABSTRACT

A hook, fishhook, or fishing spear with at least one barb fixed to the hook, fishhook, or fishing spear with an epoxy that disbonds upon the application of an electric current. Components of the barb and the hook, fishhook, or fishing spear form a loop of electrically conductive material that carries a current induced by the application of a magnetic field generated by a magnetic field generator external to the hook, fishhook, or fishing spear. A current may be generated to disband the barb from the hook, fishhook, or fishing spear in order to facilitate the removal of the hook, fishhook, or fishing spear from an impaled fish.

19 Claims, 9 Drawing Sheets

FISHING APPARATUS

I. FIELD OF THE DISCLOSURE

The present disclosure is generally related to the fields of fishhooks and fishing equipment.

II. BACKGROUND

The fishhook and fishing spear are among man's earliest tools. Archeological evidence indicates that the first Stone Age fishhooks may have been developed over twenty thousand years ago. These early fishhooks were made of bone and shell materials. As humans advanced, they constructed fishhooks from materials such as wood, bronze, and iron. The fishing spear is even older than the fishhook with archaeological evidence showing the use of spears from three hundred thousand years ago.

Steel fishhooks began to appear in the sixteenth century. Modern fishhooks are generally made with high-carbon steel, steel alloys, or stainless steel. Many fishhooks are also covered with a corrosion-resistant surface or with another coating. Fishhooks can be used to hold live or dead bait or can be added to lures (artificial devices that simulate fish prey).

FIG. 1 is a diagram illustrating a "typical" single fishhook 101. The fishhook comprises a point 110, a barb 120, a bend 130, a shank 140, and an eye 150. The point 110 is the sharpened end of the hook that impales the fish through its mouth. The point 110 is also used to impale the bait used to lure the fish. The barb 120 is a projection on the hook that generally extends away from the point and is used to "secure" the fish to the hook. The bend 130 is a curved portion of the hook that extends from the point 110 and barb 120 and connects to the shank 140 of the hook. The eye 150 of the hook is a "circle" that secures the hook to a fishing line or to a lure, such as a spinner lure. The gap 160 is the distance between the point 110 and shank 140 of the hook. Fishhooks can be produced as single, double or triple fishhooks; the "single," "double," and "triple" designations indicate how many points and shanks are attached to a single eye. Fishing spears are generally simpler than hooks, often consisting of only a set of barbs attached to a shaft that is used to throw the spear.

Current fishhooks and fishing spears may be difficult to remove from fish that have been impaled by the fishhook or fishing spear. The barb is often the cause of this difficulty because it functions to hold the fish to the hook or spear. Some modern hooks are manufactured without barbs to make removal of the hook from the fish easier; these hooks, however, may not be as effective in catching fish due to the lack of the barb. Fishermen who desire to remove fishhooks from fish to release the fish back to the wild with a minimal amount of injury to the fish thus face a conundrum: using a hook with a barb may make the removal of a hook more difficult, but using a barbless hook may reduce their ability to catch and land a fish.

III. SUMMARY

Disclosed herein are embodiments of a fishing apparatus. An embodiment of the apparatus is a hook or fishhook made of components that may be broken from the hook or fishhook upon the application of a magnetic field that induces an electric current in the components of the fishhook, thereby allowing a fisherman to more easily remove the fishhook from an impaled fish. The magnetic field may be generated by power source extraneous to the fishhook. A further embodiment of the apparatus is a fishing spear made of components that may be broken from the spear upon the application of a magnetic field that induces an electric current in the components of the fishing spear, thereby allowing a fisherman to more easily remove the fishing spear from an impaled fish. The magnetic field may be generated by power source extraneous to the fishing spear.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular embodiments of the present disclosure are described below with reference to the drawings. In the description, common features are designated by common reference numbers throughout the drawings.

Figure 1:
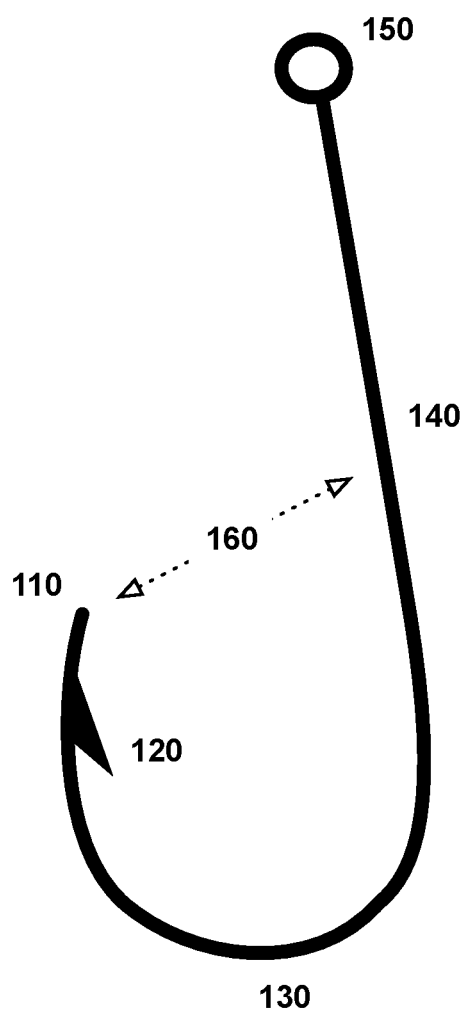
FIG. 1 is a diagram illustrating the elements of a fishhook as found in the prior art.

By way of background, as described above, FIG. 1 is a diagram illustrating a "typical" single fishhook 101. The fishhook comprises a point 110, a barb 120, a bend 130, a shank 140, and an eye 150. The point 110 is the sharpened end of the hook that impales the fish through its mouth and used to impale the bait used to lure the fish. The barb 120 is a projection on the hook that generally extends away from the point and is used to "secure" the fish to the hook. The bend 130 is a curved portion of the hook that extends from the point 110 and barb 120 and connects to the shank 140 of the hook. The eye 150 of the hook is a "circle" that secures the hook to a fishing line or to a lure, such as a spinner lure. The gap 160 is the distance between the point 110 and shank 140 of the hook.

By way of background, under the principle of electromagnetic induction, an electric current will flow in a closed conductor (such as a loop of copper wire) upon a change in the magnetic flux through the plane bounded by the closed conductor. This electric current will be caused by either (1) a change in the magnitude of the magnetic flux or (2) if the bounded area is moved through the magnetic flux. If the closed conductor is a loop of conductive wire, or a wire formed into a group of loops, the electromotive force ("EMF") induced by the change of the magnetic flux is determined by Equation 1, where epsilon ("$\epsilon$") is the EMF in volts, "N" is the number of loops of the conductive wire, "t" is time in seconds and phi ("$\Phi$") is the magnetic flux in units of volt-seconds (V*s, or webers):

$$\epsilon = -(N)*(d\Phi/dt)$$ [Equation 1]

According to Equation 1, the induced EMF is directly proportional to both the number of loops of wire and the rate of change of the magnetic flux; hence, a greater EMF results for a greater number of loops of wire. The principle of electromagnetic induction also states that an electric current flowing in a closed conductor (such as a loop of copper wire) will produce a magnetic field.

Figure 2:
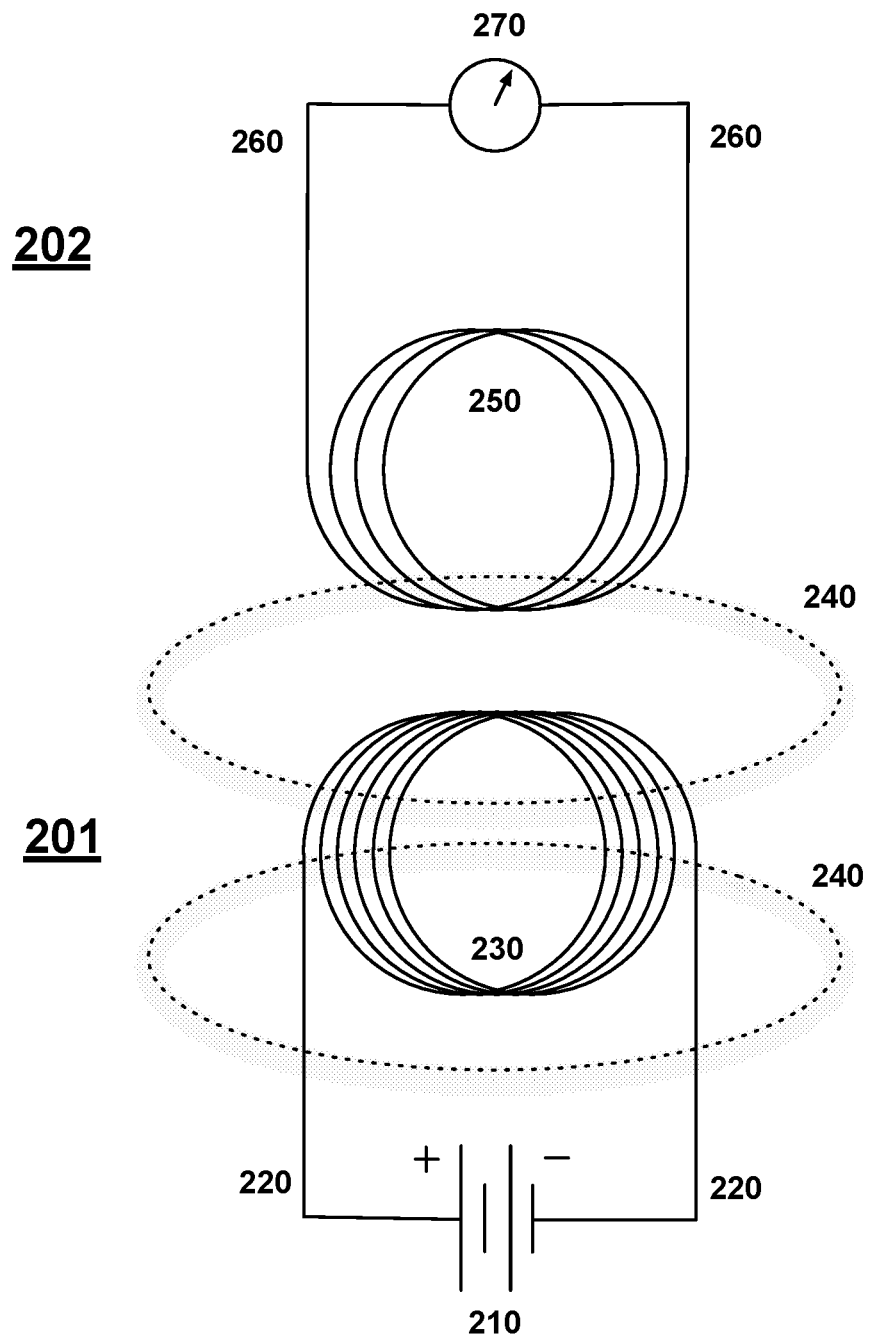
FIG. 2 is a diagram illustrating a powered device capable of producing a magnetic field proximate to an unpowered device and inducing an electric current in the unpowered device.

FIG. 2 is a diagram illustrating two devices, a magnetic field generator 201 and an electric current generator 202 that, when used in conjunction, will produce an electric current based on the principle of electromagnetic induction. In FIG. 2, a magnetic field generator 201 is made up of an electric power source 210 (such as a battery), wiring made of electrically conductive material 220, and a set of loops of the wiring made of electrically conductive material 230. When the electric power source 210 is turned on, the electric current flowing through the loops of wiring 230 will produce a magnetic field, represented by field lines 240. The electric current generator 202 illustrated in FIG. 2 is made up of a voltmeter 270, wiring made of electrically conductive material 260, and a set of loops of the wiring made of electrically conductive material 250. When the electric current generator 202 is moved into the magnetic field 240 the magnetic flux will change and will generate an electric current in the wiring electric current generator 202 is of the electric current generator 202. This electric current will register on the voltmeter 270.

By way of background, EIC Laboratories, Inc. ("EIC"), of Norwood, Mass. developed an epoxy that disbonds upon the application of an electric current (see U.S. Pat. No. 6,620, 308; U.S. Pat. No. 7,332,218; and U.S. Pat. No. 7,968,188). EIC markets this epoxy, which generally disbonds upon the application of between ten and fifty volts of current at low amperage, as ElectRelease™ (ElectRelease™ is a trademark of EIC Laboratories, Inc.).

Figure 3:
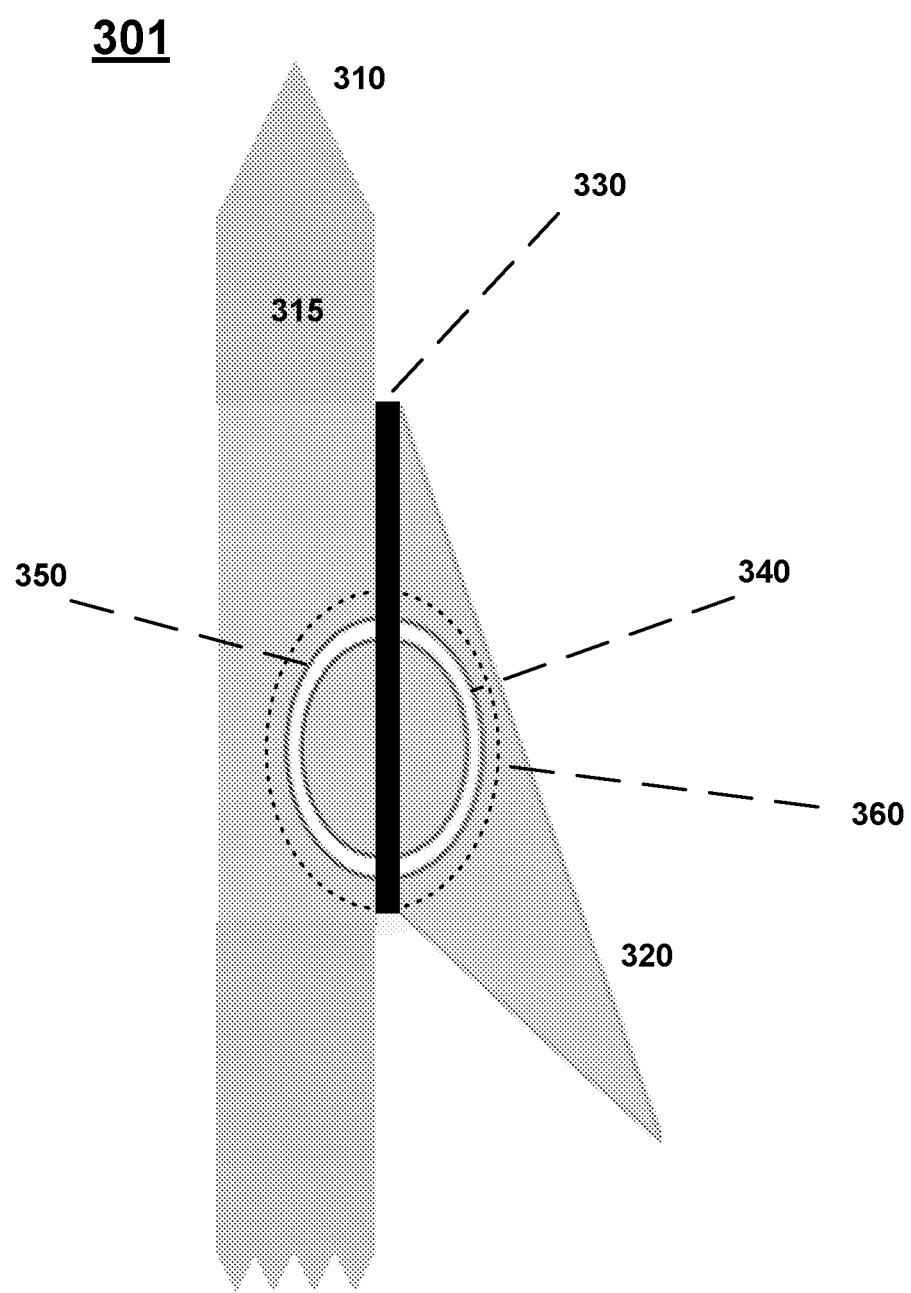
FIG. 3 is a diagram illustrating an embodiment of a fishhook with a barb portion secured to the fishhook by an epoxy.

FIG. 3 is a diagram illustrating a preferred embodiment of a hook or fishhook 301 with several components. The hook or fishook components include a point 310 and a barb 320. Although FIG. 3 illustrates a hook with one barb, hooks or fishhooks may have multiple barb components. The barb 320 (a second hook component) is fixed to the hook or fishhook component 315 (a first hook component) with a layer of an epoxy 330 that disbonds upon the application of an electric current. The barb 320 includes a barb-side electrically conductive material 340 (a second electrically conductive material) while the hook or fishhook component 315 includes a hook-side electrically conductive material 350 (a first electrically conductive material). The barb 320 may be manufactured of a material (a second material) having an electrical conductivity less than the electrical conductivity of the barb-side electrically conductive material 340 and the hook or fishhook component 315 may be manufactured of a material (a first material) having an electrical conductivity less than the electrical conductivity of the hook-side electrically conductive material 350. Note that FIG. 3 is a close-up view of the hook or fishhook 301 and omits several components of the hook or fishhook, namely, the bend 130, shank 140, and eye 150.

As seen in FIG. 3, the barb-side electrically conductive material 340 and hook-side electrically conductive material 350 will form a "loop" 360 that passes through the layer of epoxy 330.

Figure 4A:
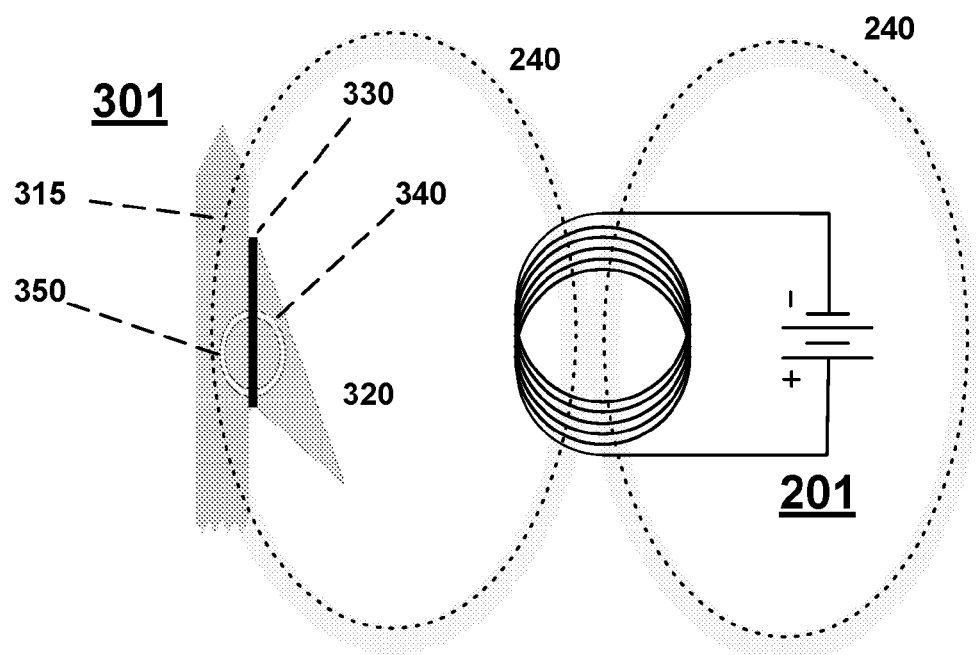
FIG. 4A is a diagram illustrating a powered device capable of producing a magnetic field proximate to a fishhook.

As depicted in FIG. 4A, a magnetic field generator 201 may be placed proximate to the hook or fishhook 301. As depicted in FIG. 4A, when the magnetic field generator 201 is turned on, it emits magnetic field lines 240. The magnetic field lines 240 will induce an electric current in the loop formed by the barb-side electrically conductive material 340, hook-side electrically conductive material 350, and the epoxy 330.

Figure 4B:
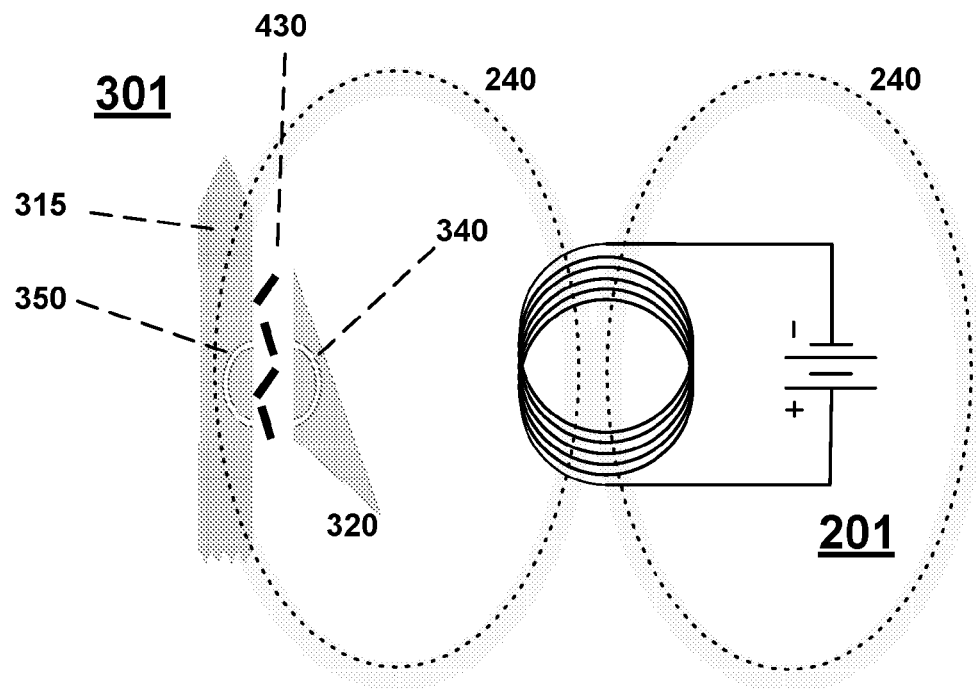
FIG. 4B is a diagram illustrating a powered device capable of producing a magnetic field inducing an electric current in a fishhook.

As depicted in FIG. 4B, after the magnetic field lines 240 induce an electric current in the loop, the epoxy will disbond 430, thereby allowing separation of the barb 320 from the hook or fishhook component 315.

If a fish has been impaled or caught with the hook or fishhook 301 illustrated in FIG. 3 then the fisherman may place a magnetic field generator 201 proximate to the hook or fishhook 301. The fisherman may then activate the magnetic field generator 201 to generate a magnetic field, which will then induce an electric current in the loop 360 formed by the barb-side electrically conductive material 340, hook-side electrically conductive material 350, and the epoxy 330. The barb 320 will then separate from the hook or fishhook component 315 and the fisherman may remove the hook or fishhook 301 from the fish and thereupon release the fish back into the wild. If the hook or fishhook 301 has completely penetrated through the fish's mouth and the barb 320 is exposed then the barb 320 may be discarded; if the hook or fishhook 301 is impaled inside the fish's mouth then the disbonded barb 320 may remain embedded in the tissue of the fish. In the latter case the fish may not be harmed because the barb 320 may be constructed of inert materials, such as metal or polymers. The fisherman also has the option to push the hook or fishhook 301 through the fish's tissue until the hook or fishhook 301 is exposed, after which the fisherman may operate the magnetic field generator 201 to disband the epoxy 330 in order to remove the barb 320 and thereupon remove the hook or fishhook 301. This procedure mirrors the common medical practice performed on humans who accidentally impale their fingers or hands on fishhooks; physicians often "push" such fishhooks through the finger or hand until the barb is exposed and thereupon remove the barb from the hook before extracting it. This procedure is performed because attempting to "pull out" a fishhook may cause more damage to human tissue as the barb is pulled through the impaled person's tissue.

The ElectRelease™ epoxy debonds at the anodic (positive) surface and leaves the cathodic (negative) surface nearly virtually free of the ElectRelease™ adhesive. A preferred embodiment would structure the hook or fishhook so that the barb-side electrically conductive material would function as the cathodic (negative) surface while the hook-side electrically conductive material would function as the anodic (positive) surface. This would ensure that less material from the hook or fishhook would remain embedded in the tissue of the impaled fish upon removal of the hook or fishhook after disbonding of the epoxy.

Figure 5A:
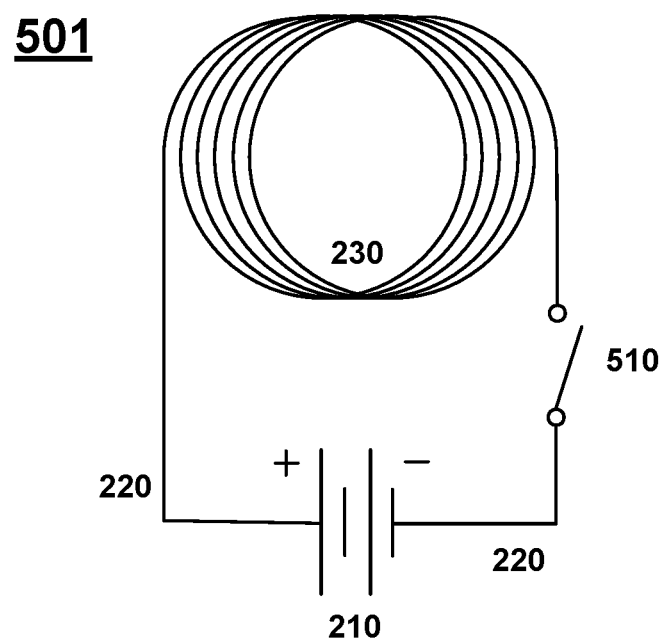
FIG. 5A is a diagram illustrating a powered device capable of producing a magnetic field and operable with a switch.
Figure 5B:
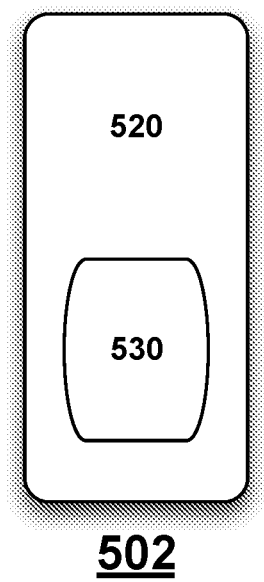
FIG. 5B is a diagram illustrating a view of a powered device capable of producing a magnetic field and operable with a switch.
Figure 5C:
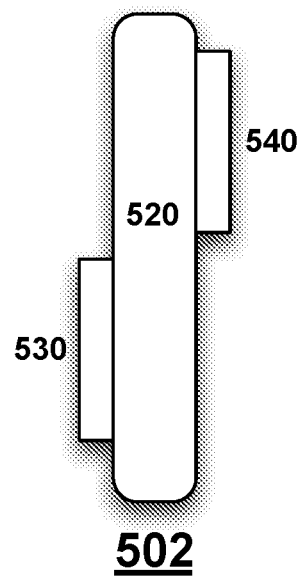
FIG. 5C is a diagram illustrating a view of a powered device capable of producing a magnetic field and operable with a switch.
Figure 5D:
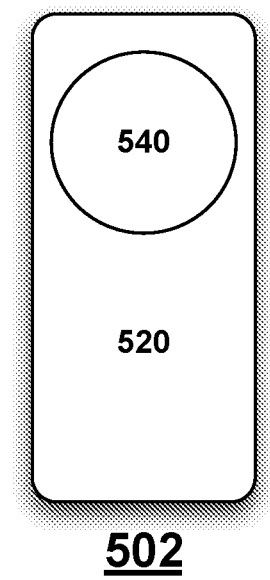
FIG. 5D is a diagram illustrating a view of a powered device capable of producing a magnetic field and operable with a switch.

FIG. 5A is a diagram illustrating an embodiment of a magnetic field generator 501 that an operator may use to induce an electric current in an embodiment of a hook or fishhook as described herein. The magnetic field generator 501 is made up of an electric power source 210 (such as a battery), wiring made of electrically conductive material 220, a set of loops 230 of the wiring made of electrically conductive material, and a switch 510, such as an "on/off" switch. Activating the switch 510 causes the electric power source 210 to provide electric current through the loops of wiring 230 and produce a magnetic field as described above. FIG. 5B is a diagram illustrating a top-down view of an embodiment of a magnetic field generator inside a housing 502 that includes a container shell 520 and a button for the switch 530. FIG. 5C is a diagram illustrating a side view of an embodiment of a magnetic field generator inside a housing 502 that includes a container shell 520, a button for the switch 530, and an emitter component 540 for the generated magnetic field. As the entire housing 502 may be transparent to a magnetic field, the emitter component 540 may be used as a reference for the operator to indicate where the operator should place the emitter component 540 relative to the hook or fishhook (such as placing the emitter component 540 on the right side of a fish's mouth if the fishhook has impaled the fish on its right side). FIG. 5D is a diagram illustrating a bottom-up view of an embodiment of a magnetic field generator inside a housing 502 that includes the container shell 520 and the emitter component 540 for the generated magnetic field.

A person operating the magnetic field generator 501 illustrated in FIGS. 5A-5D will place the container shell 520 proximate to a hook or fishhook (such as the hook or fishhook 301 as disclosed in FIG. 3), align the emitter component 540 with the hook or fishhook 301, and press the button for the switch 530. The magnetic field generator will then generate a magnetic field and induce a current in the loop of the hook or fishhook 301 formed by the barb-side electrically conductive material 340, hook-side electrically conductive material 350, and the layer of epoxy 330. The current will then cause the epoxy 330 to disbond, thereby separating the barb 320 from the hook or fishhook component 315, and facilitating removal of the hook or fishhook 301 from an impaled fish.

Figure 6:
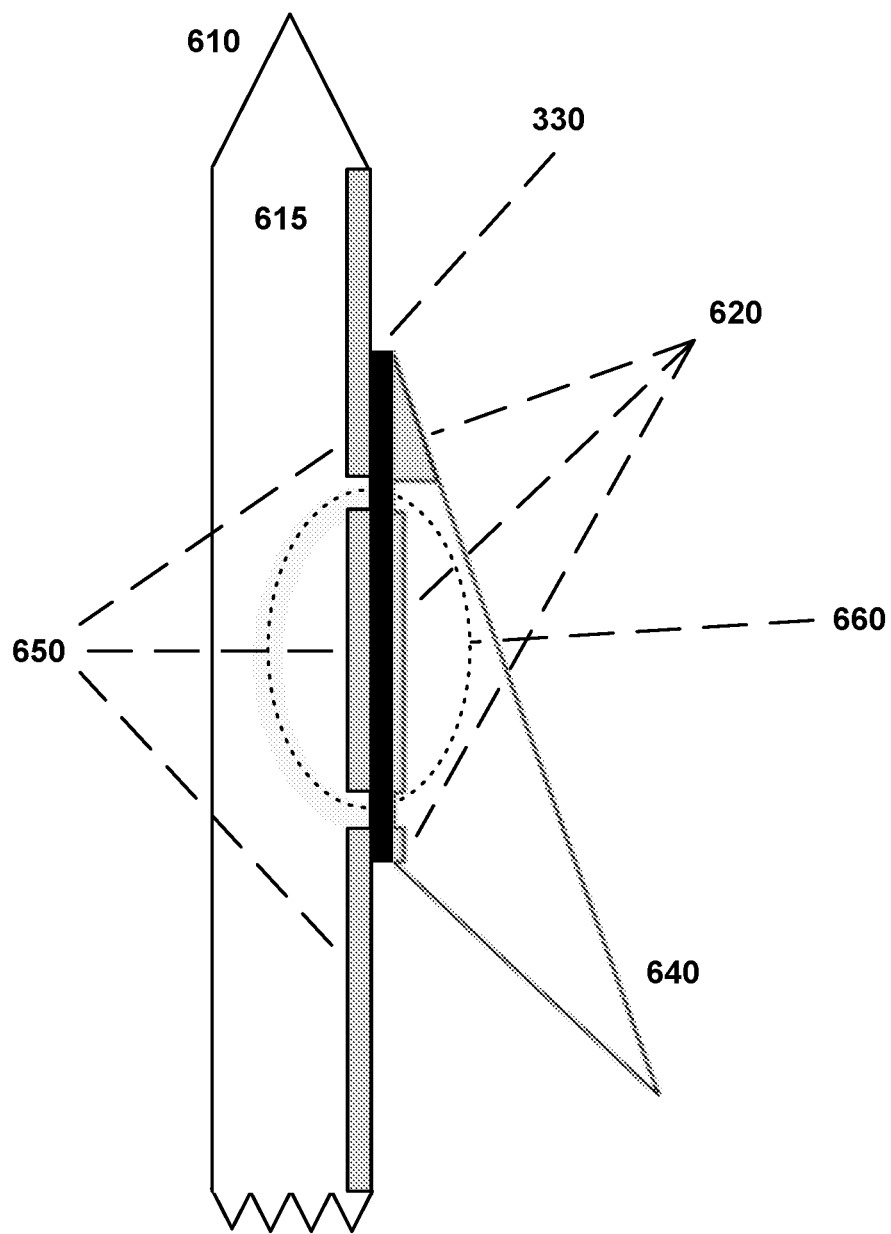
FIG. 6 is a diagram illustrating an embodiment of a fishhook with a barb portion secured to the fishhook by an epoxy wherein the fishhook and barb are made of an electrically conductive material.

FIG. 6 is a diagram illustrating an embodiment of a hook or fishook 601 with several components. The hook or fishook components include a point 610 and a barb 640 (a second hook component). Although FIG. 6 illustrates a hook or fishhook with one barb, hooks or fishhooks may have multiple barb components. The barb 640 is fixed to the hook or fishhook component 615 (a first hook component) with a layer of an epoxy 330 that disbonds upon the application of an electric current. Note that FIG. 6 is a close-up view of the hook or fishhook 601 and omits several components of the hook or fishhook 601, namely, the bend 130, shank 140, and eye 150.

In the embodiment presented in FIG. 6, the barb 640 is predominantly made of an electrically conductive material (a second electrically conductive material) with barb-side nonconductive components 620 made of a nonconductive material (a second material) that may be bonded by the epoxy 330. The barb-side nonconductive components 620 may take the form of a laminate, such as paint or another electrically nonconductive material, that is applied to the barb 640. Likewise, the hook or fishhook component 615 is predominantly made of an electrically conductive material (a first electrically conductive material) with hook-side nonconductive components 650 made of a nonconductive material (a first material) that may be bonded by the epoxy 330. The hook-side nonconductive components 650 may take the form of a laminate, such as paint or another nonconductive material, that is applied to the hook or fishhook component 615. The arrangement of the barb-side nonconductive components 620 and hook-side nonconductive components 650 may then form a loop 660 that passes through the layer of epoxy 330. The barb-side nonconductive components 620 and hook-side nonconductive components 650 must have an electrical conductivity less than the material used to manufacture the barb 640 and hook or fishhook component 615.

A magnetic field generator, such as the magnetic field generator 201 previous described, may be placed proximate to the hook or fishhook 601. When the magnetic field generator 201 is turned on, it will emit magnetic field lines that will induce an electric current in the loop 660 formed by the barb 640 and hook or fishhook component 615. The electric current will disbond the epoxy 330, thereby separating the barb 640 from the hook or fishhook component 615, much as described above in the discussion pertaining to FIGS. 4A and 4B. The hook or fishhook 601 can then be removed from the impaled fish as described above.

Figure 7:
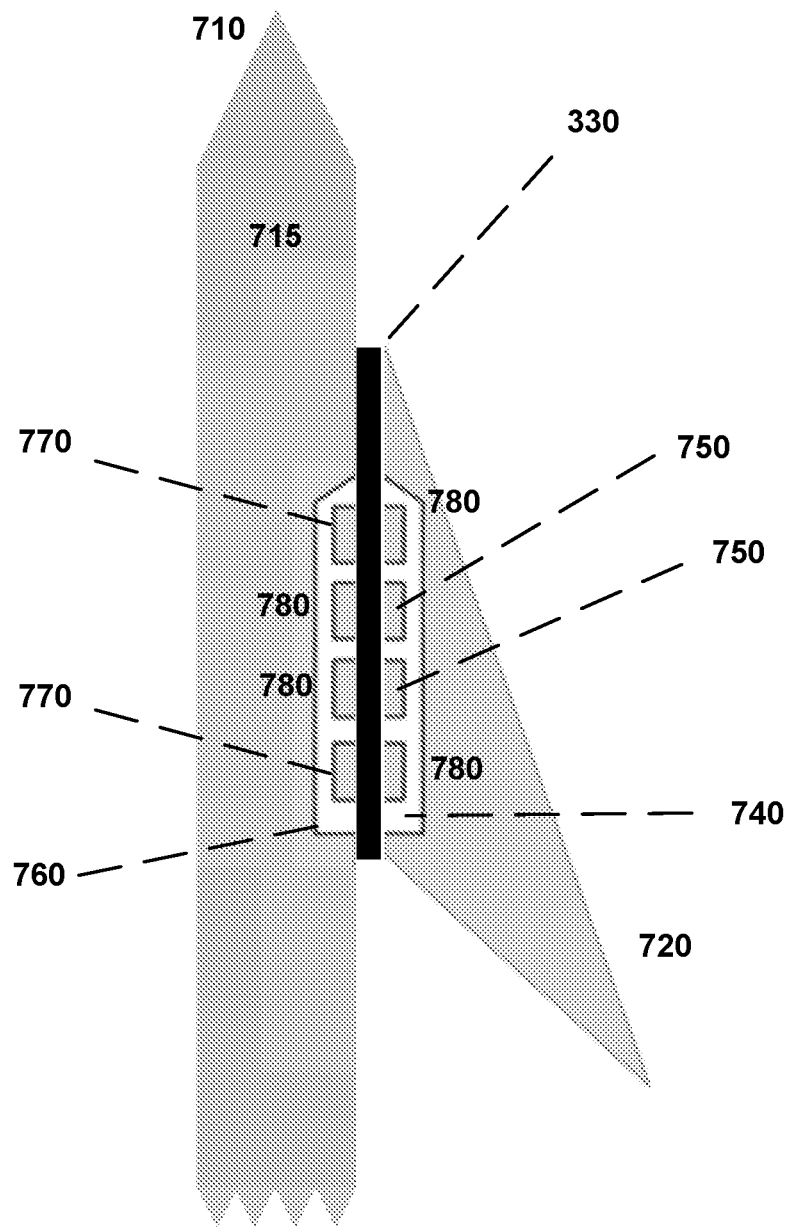
FIG. 7 is a diagram illustrating an embodiment of a fishhook with a barb portion secured to the fishhook by an epoxy, the fishhook including multiple loops of a conductive material.

FIG. 7 is a diagram illustrating an embodiment of a hook or fishhook 701 with several components. The hook or fishook components include a point 710 and a barb 720. Although FIG. 7 illustrates a hook or fishhook with one barb, hooks or fishhooks may have multiple barb components. The barb 720 is fixed to the hook or fishhook component 715 with a layer of an epoxy 330 that disbonds upon the application of an electric current. Note that FIG. 7 is a close-up view of the hook or fishhook 701 and omits several components of the hook or fishhook 701, namely, the bend 130, shank 140, and eye 150. The barb 720 includes a barb-side electrically conductive material 740 while the hook or fishhook component 615 includes a hook-side electrically conductive material 760. The barb 720 may be manufactured of a material having an electrical conductivity less than the electrical conductivity of the barb-side electrically conductive material 740 and the hook or fishhook component 715 may be manufactured of a material having an electrical conductivity less than the electrical conductivity of the hook-side electrically conductive material 750.

As seen in FIG. 7, the barb-side electrically conductive material 740 and hook-side electrically conductive material 760 form a plurality of loops 780 that pass through the layer of epoxy 330. These plurality of loops 780 will be of the form of parallel circuits; in the event that one portion the epoxy 330 disbonds near one loops, the current will continue to flow in the other loops.

A magnetic field generator, such as the magnetic field generator 201 previous described, may be placed proximate to the hook or fishhook 701. When the magnetic field generator 201 is turned on, it will emit magnetic field lines that will induce an electric current in the parallel circuit loops 780 formed by the barb-side electrically conductive material 740, the hook-side electrically conductive material 760, and the epoxy 330. The electric current will disbond the epoxy 330, thereby separating the barb 720 from the hook or fishhook component 715, much as described above in the discussion pertaining to FIGS. 4A and 4B. The hook or fishhook 701 can then be removed from the impaled fish as described above.

Figure 8:
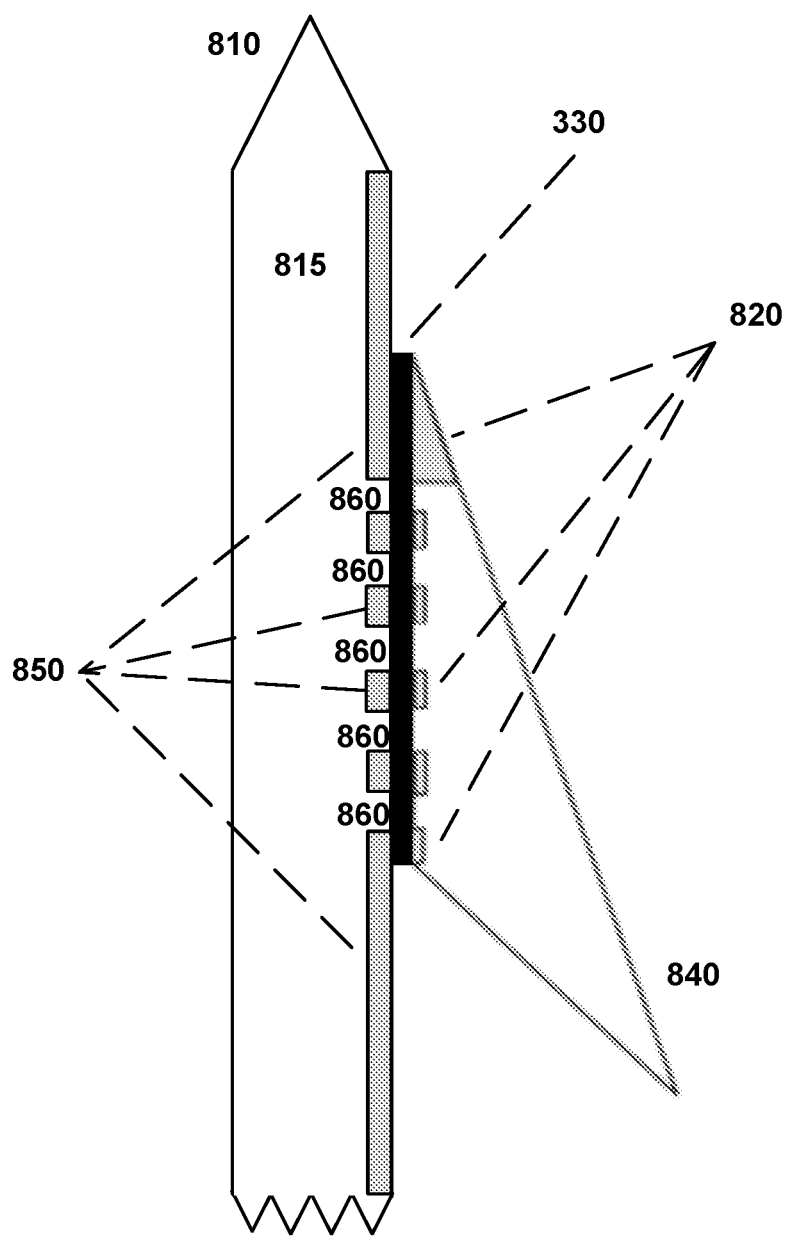
FIG. 8 is a diagram illustrating an embodiment of a fishhook with a barb portion secured to the fishhook by an epoxy wherein the fishhook and bar are made of an electrically conductive material and the fishhook includes multiple loops of a conductive material.

FIG. 8 is a diagram illustrating an embodiment of a hook or fishhook 801 with several components. The hook or fishhook components include a point 810 and a barb 840. Although FIG. 8 illustrates a hook or fishhook with one barb, hooks or fishhooks may have multiple barb components. The barb 840 is fixed to the hook or fishhook component 815 with a layer of an epoxy 330 that disbonds upon the application of an electric current. Note that FIG. 8 is a close-up view of the hook or fishhook 801 and omits several components of the hook or fishhook 801, namely, the bend 130, shank 140, and eye 150.

In the embodiment presented in FIG. 8, the barb 840 is predominantly made of an electrically conductive material with barb-side nonconductive components 820 that may be bonded by the epoxy 330. The barb-side nonconductive components 820 may take the form of a laminate, such as paint or another electrically nonconductive material, that is applied to the barb 840. Likewise, the hook or fishhook component 815 is predominantly made of an electrically conductive material with hook-side nonconductive components 850 that may be bonded by the epoxy 330. The hook-side nonconductive components 850 may take the form of a laminate, such as paint or another nonconductive material, that is applied to the hook or fishhook component 815. The arrangement of the barb-side nonconductive components 820 and hook-side nonconductive components 850 may then form a plurality of loops 860 that pass through the layer of epoxy 330. These plurality of loops 860 will be of the form of parallel circuits; in the event that one portion the epoxy 330 disbonds near one loops, the current will continue to flow in the other loops. The barb-side nonconductive components 820 and hook-side nonconductive components 850 must have an electrical conductivity less than the material used to manufacture the barb 840 and hook or fishhook component 815.

A magnetic field generator, such as the magnetic field generator 201 previous described, may be placed proximate to the hook or fishhook 801. When the magnetic field generator 201 is turned on, it will emit magnetic field lines that will induce an electric current in the parallel circuit loops 860 formed by the barb 640 and hook or fishhook component 815. The electric current will disbond the epoxy 330, thereby separating the barb 840 from the hook or fishhook component 815, much as described above in the discussion pertaining to FIGS. 4A and 4B. The hook or fishhook 801 can then be removed from the impaled fish as described above.

Figure 9:
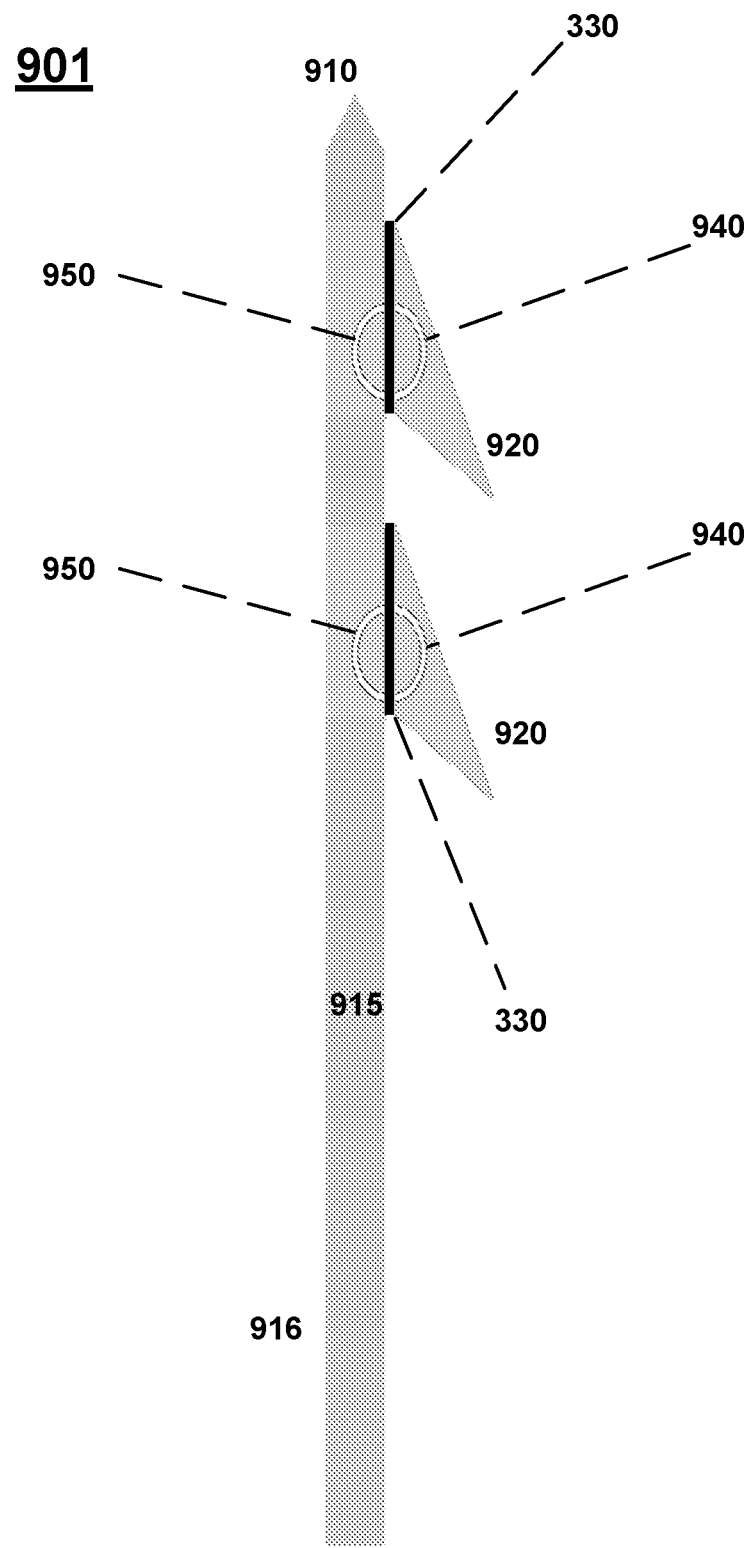
FIG. 9 is a diagram illustrating an embodiment of a fishing spear with two barb portions secured to the fishing spear by an epoxy.

FIG. 9 is a diagram illustrating an embodiment of a fishing spear 901 with several components. The components of the fishing spear 901 function in an analogous manner to the components of the disclosed hook or fishhook embodiments. The fishing spear components include a point or tip 910, a shaft 916, and one or more barbs 920 (each a second fishing spear component). The point or tip 910 is the sharpened end of the spear that impales the fish. Each barb 920 is a projection on the spear that generally extends away from the spear and is used to "secure" the fish to the spear. The user of the spear throws it from the shaft 916; the spear may also be "thrown" by spear guns or other means. Each barb 920 is fixed to the fishing spear 901 with a layer of an epoxy 930 that disbonds upon the application of an electric current. Each barb 920 includes a barb-side electrically conductive material 940 (a second electrically conductive material) while the fishing spear component 915 (a first fishing spear component) includes a spear-side electrically conductive material 950 (a first electrically conductive material). Each barb 920 may be manufactured of a material (a second material) having an electrical conductivity less than the electrical conductivity of the barb-side electrically conductive material 940 and the fishing spear component 915 may be manufactured of a material (a first material) having an electrical conductivity less than the electrical conductivity of the spear-side electrically conductive material 950. The barb-side electrically conductive material 940 and spear-side electrically conductive material 950 will form a loop that passes through the layer of epoxy 330. A magnetic field generator, such as the magnetic field generator 201 previously described, may be placed proximate to the fishing spear 901. As described above, a magnetic field generated by such a magnetic field generator will induce an electric current in the loop formed by the barb-side electrically conductive material 940, spear-side electrically conductive material 950, and the layer of epoxy 330. The epoxy will then disbond, thereby separating the barb 920 from the fishing spear component 915, making removal of the spear 901 from an impaled fish easier.

In another embodiment, a hook, fishhook, or fishing spear as described herein, such as the hook or fishhook 301 illustrated in FIG. 3, may further comprise two additional external electrically conductive components, such as two sets of wiring. A first external electrically conductive component will connect to the barb-side electrically conductive material 340 and a second external electrically conductive component will connect to the hook-side electrically conductive material 350. The additional external electrically conductive components may connect to a electrical power source external to the hook or fishhook 301, such as a battery connected to a fishing rod (to which the hook or fishhook 301 is attached via a fishing line). This power source or battery may be operable by a switch and will provide current to the barb-side electrically conductive material 340 and to the hook-side electrically conductive material 350. This current will travel through the two additional external electrically conductive components into loop formed by the barb-side electrically conductive material 340, the hook-side electrically conductive material 350, and the layer of epoxy 330. The current will cause the epoxy 330 to disbond upon passing through it, thereby separating the barb 320 from the hook or fishhook component 315. In this embodiment, the magnetic field generator, such as the magnetic field generator 201 depicted in FIG. 4A or FIG. 4B, is not required.

Another benefit of the hooks, fishhooks, and fishing spears disclosed herein is that modified barbs, such as barb 320 of FIG. 3, barb 640 of FIG. 6, barb 720 of FIG. 7, barb 840 of FIG. 8, and barb 920 of FIG. 9 may be reattached to their corresponding hooks, fishhooks, or fishing spears by affixing the barbs to the hook, fishhook, or fishing spear with a new layer of epoxy 330.

Embodiments described above are illustrative and do not limit the disclosure. Numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to fewer than all of the features of any of the disclosed embodiments.

I claim:

1. An apparatus, comprising:
   a fishhook, comprising:
      a first hook component comprising a first material and a first electrically conductive material;
      a second hook component comprising a second material and a second electrically conductive material; and
      an epoxy that disbonds upon an application of an electric current, wherein the epoxy bonds the second hook component to the first hook component, wherein the first electrically conductive material and the second electrically conductive material form one or more loops that produce electric current upon an application of a magnetic field, the one or more loops passing through the epoxy.

2. The apparatus of claim 1, wherein the second hook component comprises a barb.

3. The apparatus of claim 1, wherein the one or more loops that produce electric current upon the application of the magnetic field are parallel circuits.

4. The apparatus of claim 1, wherein the first material has an electrical conductivity less than an electrical conductivity of the first electrically conductive material.

5. The apparatus of claim 1, wherein the second material has an electrical conductivity less than an electrical conductivity of the second electrically conductive material.

6. The apparatus of claim 1, further comprising a device capable of producing a magnetic field, wherein the device is external to the fishhook.

7. The apparatus of claim 6, wherein the device capable of producing a magnetic field further comprises a switch.

8. The apparatus of claim 1, further comprising:
   an electric power source external to the fishhook, wherein the electric power source is operable by a switch;
   a first external electrically conductive component connecting the electric power source to the first electrically conductive material; and
   a second external electrically conductive component connecting the electric power source to the second electrically conductive material.

9. A method to remove a fishhook, comprising the steps of:
   applying a magnetic field to the fishhook, wherein the fishhook comprises:
      a first hook component comprising a first material and a first electrically conductive material;
      a second hook component comprising a second material and a second electrically conductive material; and
      an epoxy that disbonds upon an application of an electric current, wherein the epoxy bonds the second hook component to the first hook component, wherein the first electrically conductive material and the second electrically conductive material form one or more loops that produce electric current upon an application of a magnetic field, the one or more loops passing through the epoxy;
   generating an electric current that passes through the first electrically conductive material and the second electrically conductive material, the electric current generated by the application of the magnetic field;
   disbonding the epoxy upon the passage of the electric current through the epoxy; and
   separating of the second hook component from the first hook component after the epoxy has disbonded.

10. The method of claim 9, wherein the second hook component comprises a barb.

11. The method of claim 9, wherein the one or more loops that produce electric current upon the application of the magnetic field are parallel circuits.

12. The method of claim 9, wherein the first material has an electrical conductivity less than an electrical conductivity of the first electrically conductive material.

13. The method of claim 9, wherein the second material has an electrical conductivity less than an electrical conductivity of the second electrically conductive material.

14. The method of claim 9, wherein a device external to the hook generates the magnetic field, wherein the device external to the hook further comprises a switch.

15. An apparatus, comprising:
   a fishing spear, comprising:
      a first fishing spear component comprising a first material and a first electrically conductive material;
      a second fishing spear component comprising a second material and a second electrically conductive material; and
      an epoxy that disbonds upon an application of an electric current, wherein the epoxy bonds the second fishing spear component to the first fishing spear component, wherein the first electrically conductive material and the second electrically conductive material form one or more loops that produce electric current upon an application of a magnetic field, the one or more loops passing through the epoxy.

16. The apparatus of claim 15 wherein the second fishing spear component comprises a barb.

17. The apparatus of claim 15, wherein the one or more loops that produce electric current upon the application of the magnetic field are parallel circuits.

18. The apparatus of claim 15, wherein the first material has an electrical conductivity less than an electrical conductivity of the first electrically conductive material and the second material has an electrical conductivity less than an electrical conductivity of the second electrically conductive material.

19. The apparatus of claim 15, further comprising a device capable of producing the magnetic field, wherein the device is external to the fishing spear.

* * * * *